(12) United States Patent
Yasunaga

(10) Patent No.: US 10,304,031 B2
(45) Date of Patent: May 28, 2019

(54) IMAGE PROCESSING APPARATUS

(71) Applicant: Toshiba Tec Kabushiki Kaisha, Tokyo (JP)

(72) Inventor: Masaaki Yasunaga, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 479 days.

(21) Appl. No.: 14/748,003

(22) Filed: Jun. 23, 2015

(65) Prior Publication Data
US 2016/0379159 A1 Dec. 29, 2016

(51) Int. Cl.
*G06Q 30/02* (2012.01)
*G06Q 10/08* (2012.01)
*H04N 7/18* (2006.01)
*G06K 9/00* (2006.01)

(52) U.S. Cl.
CPC ....... *G06Q 10/087* (2013.01); *G06K 9/00671* (2013.01); *H04N 7/18* (2013.01); *H04N 7/185* (2013.01)

(58) Field of Classification Search
CPC ...... G06Q 10/08; G06Q 10/087; G06Q 10/00; G06Q 30/00; G06K 9/00671; G06K 9/62; G06K 9/52; G06K 9/00; H04N 7/18; H04N 7/185; G09F 3/00
See application file for complete search history.

(56) References Cited

U.S. PATENT DOCUMENTS

| | | | |
|---|---|---|---|
| 2008/0077511 A1* | 3/2008 | Zimmerman | G06Q 10/00 705/28 |
| 2010/0135522 A1 | 6/2010 | Batt | |
| 2011/0173082 A1* | 7/2011 | Breitenbach | G06Q 10/06311 705/16 |
| 2015/0088701 A1* | 3/2015 | Desmarais | G06Q 10/087 705/28 |

* cited by examiner

*Primary Examiner* — Patricia I Young
(74) *Attorney, Agent, or Firm* — Kim & Stewart LLP

(57) ABSTRACT

According to one embodiment, an image processing apparatus includes an acquiring unit, a label specifying unit, an article position information acquiring unit, and an article searching unit. The acquiring unit acquires a photographed image in which a label with information regarding an article is photographed. The label specifying unit identifies the label from the photographed image. The article position information acquiring unit acquires article position information that is associated with the label and which indicates a position of the article by a relative positional relationship with the label. The article searching unit searches if there is an article associated with the label at a position indicated by the article position information.

8 Claims, 14 Drawing Sheets

| Product shelf ID | Product ID | Product specifying information |
|---|---|---|
| 001 | 000001 | Data 1 |
| 001 | 023574 | Data 2 |
| 001 | 103820 | Data 3 |
| 001 | 067195 | Data 4 |
| 002 | 388121 | Data 5 |
| 002 | 038242 | Data 6 |

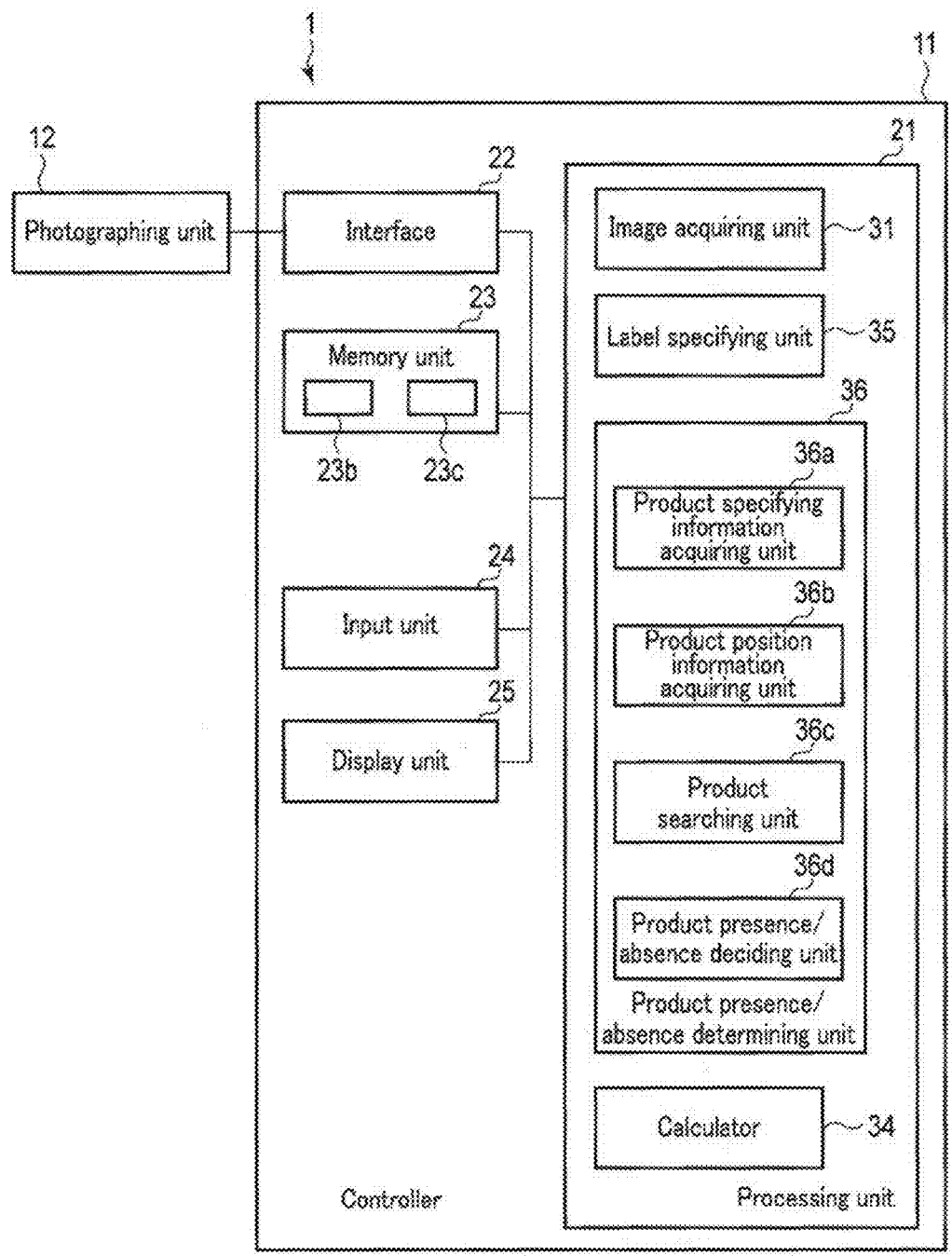
F I G. 7

| Label ID | Label type | Product ID | Product specifying information |
|---|---|---|---|
| 0000001 | A | 000001 | Data 1 |
| 0000002 | B | 023574 | Data 2 |
| 0000003 | C | 103820 | Data 3 |
| 0000004 | D | 067195 | Data 4 |
| 0000005 | E | 368121 | Data 5 |
| 0000006 | F | 038242 | Data 6 |

FIG. 8

| Label type | Product position information |
|---|---|
| A | Data A |
| B | Data B |
| C | Data C |
| D | Data D |
| E | Data E |
| F | Data F |

FIG. 9

| Stock quantity B | Number of product A on shelves | |
|---|---|---|
|  | A≠0 | A=0 |
| B=0 | No alert | Stock outage |
| B≠0 | No alert | Product shortage |

FIG. 18

| Stock quantity B | Number of product A on shelves | | |
|---|---|---|---|
|  | A > α | A ≤ α | A=0 |
| B=0 | No alert | Stock outage warning | Stock outage |
| B≠0 | No alert | Product shortage warning | Product shortage |

FIG. 19

| Purchased quantity C | Number of product A on shelves | |
|---|---|---|
| | A≠0 | A=0 |
| C−Sales quantity ≦ β | No alert | Stock outage |
| C−Sales quantity > β | No alert | Product shortage |

F I G. 20

| Purchased quantity C | Number of product A on shelves | | |
|---|---|---|---|
| | A≠0 | A≦α | A=0 |
| C−Sales quantity ≦ β | No alert | Stock outage warning | Stock outage |
| C−Sales quantity > β | No alert | Product shortage warning | Product shortage |

F I G. 21

IMAGE PROCESSING APPARATUS

FIELD

Embodiments described herein relate generally to an image processing apparatus.

BACKGROUND

At stores handling products, products are arranged on shelves etc. based on a product layout plan diagram, etc. A store employee is required to routinely check if the products are arranged according to the product layout plan diagram. Conventionally, the state of the displayed products was checked visually by a store employee, which required manpower and time.

BRIEF DESCRIPTION OF THE DRAWINGS

FIG. 7 is a block diagram showing a configuration example of the image processing apparatus of the second embodiment.

FIG. 8 is a diagram showing a configuration example of a label product database of the second embodiment.

FIG. 9 is a diagram showing a configuration example of a product position database of the second embodiment.

FIG. 18 is a diagram showing a configuration example of an alert table of the fourth embodiment.

FIG. 19 is a diagram showing another configuration example of an alert table of the fourth embodiment.

FIG. 20 is a diagram showing another configuration example of an alert table of the fourth embodiment.

FIG. 21 is a diagram showing another configuration example of an alert table of the fourth embodiment.

DETAILED DESCRIPTION

In general, according to one embodiment, an image processing apparatus includes an acquiring unit, a label specifying unit, an article position information acquiring unit, and an article searching unit. The acquiring unit acquires a photographed image in which a label with information regarding an article is photographed. The label specifying unit specifies the label from the photographed image. The article position information acquiring unit acquires article position information that is associated with the label and which indicates a position of the article by a relative positional relationship with the label. The article searching unit searches if there is an article associated with the label at a position indicated by the article position information.

Hereinafter, embodiments will be explained with reference to the drawings.

(First Embodiment)

An image processing apparatus according to a first embodiment is explained below.

Figure 1:
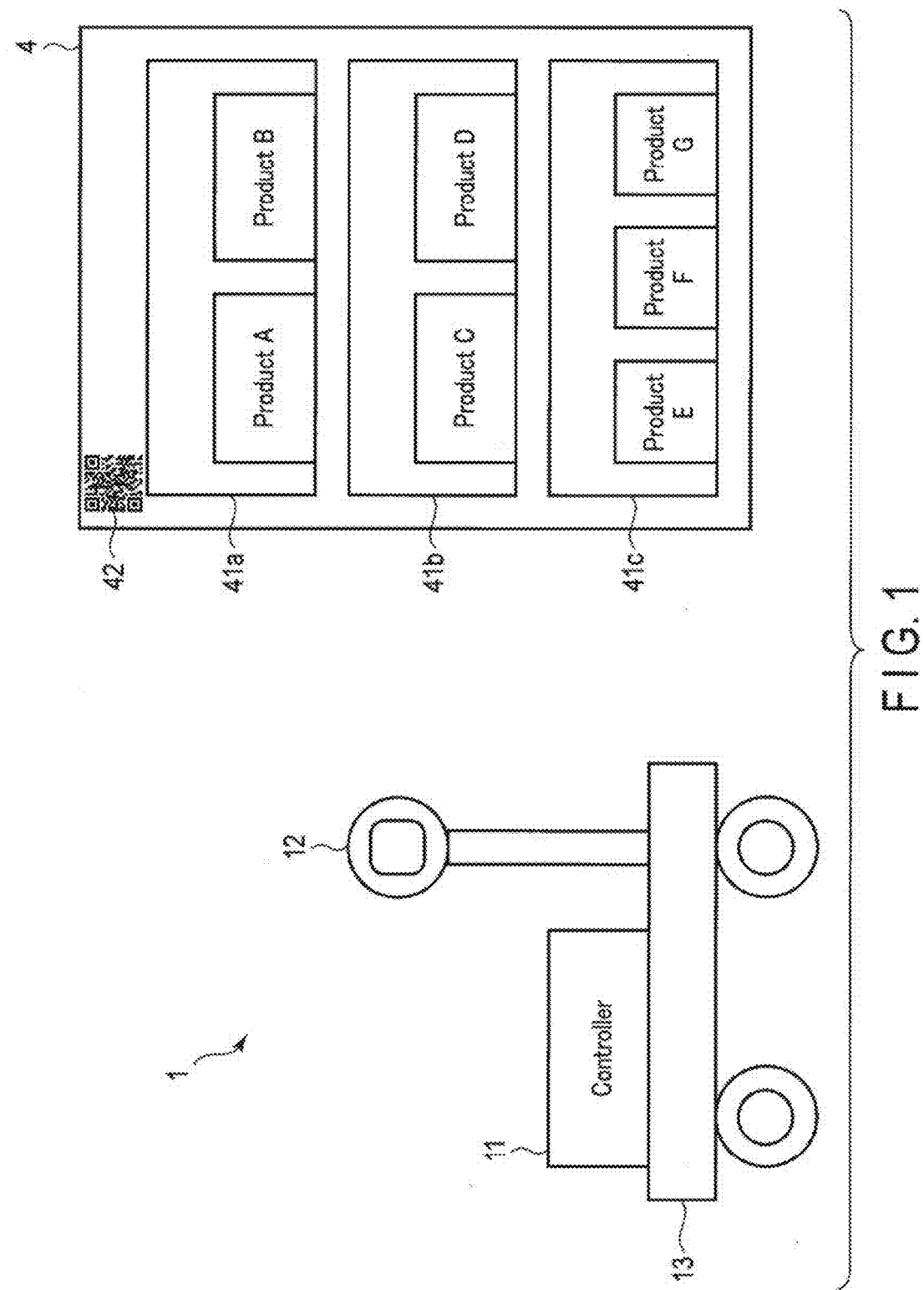
FIG. 1 is a diagram schematically showing a configuration example of an image processing apparatus of a first embodiment.

FIG. 1 is a diagram schematically showing a configuration example of an image processing apparatus 1 and a product shelf 4.

The image processing apparatus 1 is set at stores, etc. which arrange products on the product shelf 4. The image processing apparatus 1 checks if the products (articles) arranged on the product shelf 4 are properly arranged. The image processing apparatus 1 may check if the products are properly arranged on the product shelf 4 before the stores at which the product shelf 4 is placed opens. The image processing apparatus 1 may also periodically check the arrangement of the products during business hours.

The arrangement the image processing apparatus 1 checks is not limited to the products displayed at stores. The arrangement checked by the image processing apparatus 1 is not limited to a specific product.

The image processing apparatus 1 includes a controller 11, a photographing unit 12, and a cart 13, etc.

The controller 11 checks if the products are properly arranged based on an image photographed by the photographing unit 12. The controller 11 will be explained in detail later.

The photographing unit 12 photographs the product shelf 4. The photographing unit 12 is fixed at a predetermined height on the cart 13. For example, the photographing unit 12 is fixed at a height capable of photographing the product shelf 4 from the top to bottom.

The photographing unit 12 photographs the product shelf 4 in accordance with a signal from the controller 11. The photographing unit 12 transmits the photographed image to the controller 11.

The photographing unit 12 is, for example, a CCD camera.

The cart 13 carries the controller 11 and the photographing unit 12. The cart 13 enables the controller 11 and the photographing unit 12 to move. For example, the cart 13 enables the photographing unit 12 to move in a state where the photographing unit 12 is fixed at a predetermined height. For example, the cart 13 has the photographing unit 12 fixed at a height where the product shelf 4 is photographable. For example, the cart 13 moves by an attendant pushing the cart 13.

The controller 11 and the photographing unit 12 may be connected wirelessly. For example, the photographing unit 12 may be a portable camera, a smart phone, or a tablet PC, etc.

The image processing apparatus 1 does not have to include the cart 13. For example, the image processing apparatus 1 may be fixed to a predetermined place. The photographing unit 12 may be fixed to a predetermined place where a predetermined product shelf 4 is photographable.

The product shelf 4 is placed in stores, etc. in a manner to display the products. For example, the product shelf 4 stores products to be shown externally.

The product shelf 4 includes storage spaces 41a to 41c and a code display area 42.

The storage spaces 41a to 41c store products. For example, the storage spaces 41a to 41c are formed so as to allow the products to be arranged or taken out from a predetermined side (surface) of the product shelf 4. Here, the product shelf 4 has three storage spaces 41. The number of storage spaces 41 and the shape thereof are not limited to a specific configuration.

The code display area 42 is an area where a shelf specifying code that specifies the product shelf 4 is displayed. For example, the shelf specifying code is a one-dimensional code or a two-dimensional code. For example, when decoded, the shelf specifying code indicates a product shelf ID, etc. that uniquely specifies the product shelf 4. The shelf specifying code may be a character string, a number, a symbol, or a combination thereof. The configuration of the shelf specifying code is not limited to a specific configuration.

In the example shown in FIG. 1, the code display area 42 is arranged on the upper left of the product shelf 4. The code display area 42 may be arranged at any place on the product shelf 4. The code display area 42 may also be arranged on a plate, etc. set on an upper side, etc. of the product shelf 4. The place where the code display area 42 is arranged is not limited to a specific configuration.

The configuration example of the image processing apparatus 1 is explained below.

Figure 2:
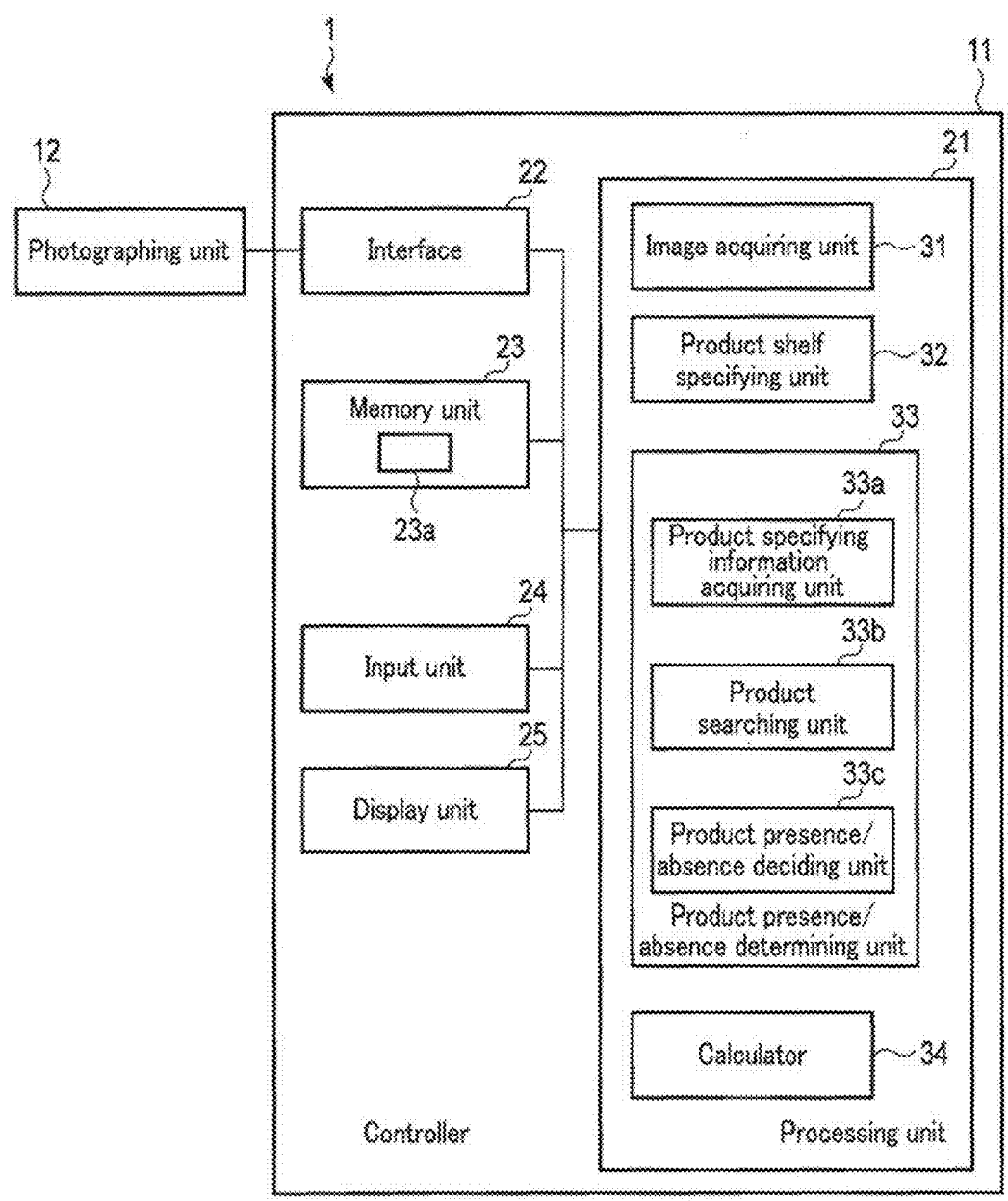
FIG. 2 is a block diagram showing a configuration example of the image processing apparatus of the first embodiment.

FIG. 2 is a block diagram showing a configuration example of the image processing apparatus 1.

As shown in FIG. 2, the image processing apparatus 1 includes the controller 11 and the photographing unit 12, etc.

The controller 11 includes a processing unit 21, an interface 22, a memory unit 23, an input unit 24, and a display unit 25.

The processing unit 21 has a function for controlling operation of the entire image processing apparatus 1. The processing unit 21 may also include, for example, a processor (CPU), an inner memory, a ROM, a RAM, and various interfaces. The processor of the processing unit 21 realizes the function of the processing unit 21 by executing a program stored in advance in the inner memory, the ROM, the RAM, or the memory unit 23.

A part of the various functions realized by the processing unit 21 executing the program may be realized by a hardware circuit. In this case, the processing unit 21 controls the function executed by the hardware circuit.

The ROM is a non-volatile memory on which a control program and control data, etc. are stored in advance. The control program and the control data stored on the ROM are preloaded in accordance with the specification of the image processing apparatus 1. The ROM stores, for example, a program (for example, BIOS) that controls a circuit substrate of the image processing apparatus 1.

The RAM is a volatile memory. The RAM temporarily stores data, etc. in process at the processing unit 21. The RAM stores various applications based on an instruction from the processing unit 21. The RAM may also store data necessary for executing an application program and an execution result of the application program, etc.

An interface 22 communicates with the photographing unit 12. For example, the interface 22 transmits a signal to the photographing unit 12 for causing the photographing unit 12 to photograph an image in accordance with a signal from the processing unit 21. The interface 22 also transmits the image photographed by the photographing unit 12 to the processing unit 21. For example, the interface 22 may be an interface that supports a USB connection.

The memory unit 23 is a non-volatile memory. For example, the memory unit 23 is a memory on which data may be written or rewritten. The memory unit 23 is, for example, configured by a hard disc, an SSD, or a flash memory. The memory unit 23 may store a control program, an application, and various data in accordance with the operation purpose of the image processing apparatus 1.

The memory unit 23 includes a memory area 23a that stores a shelf product database. The shelf product database will be explained later on.

An operator of the image processing apparatus 1 inputs various operation instructions by the input unit 24. The input unit 24 transmits the data of the operation instructions input by the operator to the processing unit 21. The input unit 24 is, for example, a keyboard, a numeric keypad, and a touch panel.

The display unit 25 is a display device that displays various information under the control of the processing unit 21. The display unit 25 is, for example, a liquid crystal monitor. If the input unit 24 is configured by a touch panel etc., the display unit 25 may be formed integrally with the input unit 24.

The shelf product database that is stored in the memory area 23a of the memory unit 23 is explained below.

The shelf product database indicates product specifying information that specifies the products arranged on the product shelf 4.

Figures 3, 4:
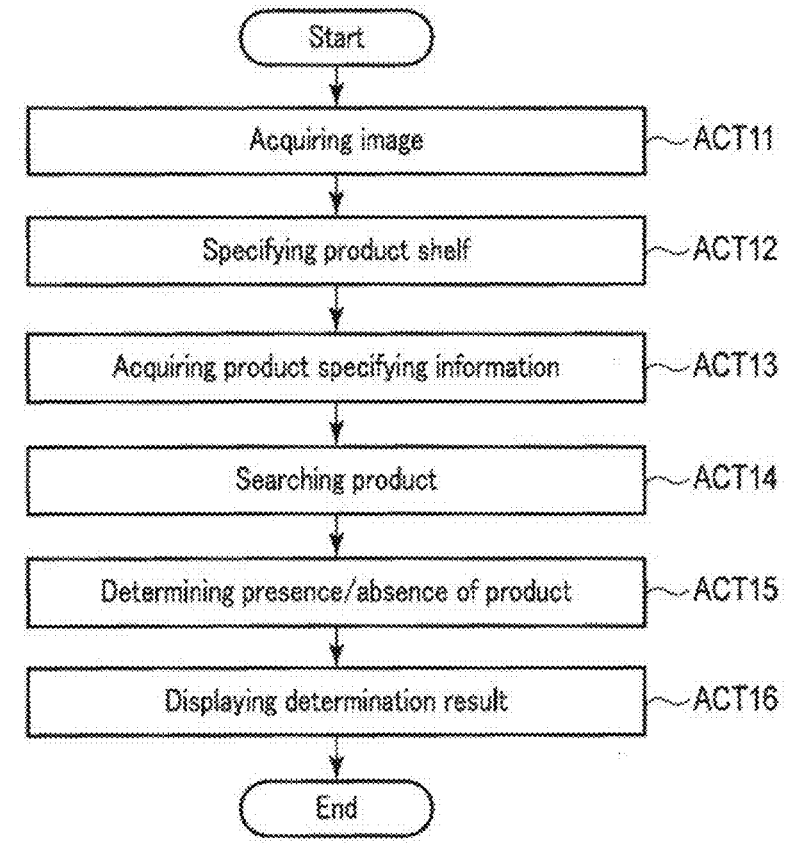
FIG. 3 is a diagram showing a configuration example of a shelf product database of the first embodiment.
FIG. 4 is a flowchart showing an operation example of the image processing apparatus of the first embodiment.

As shown in FIG. 3, the shelf product database associates and stores a product shelf ID, a product ID, and product specifying information.

The product shelf ID is an ID that specifies the product shelf 4. For example, the product shelf ID is obtained by decoding the shelf specifying code.

The product ID indicates the products arranged on the product shelf 4 indicated by the corresponding product shelf ID. In other words, the product ID indicates the products to be stored on the product shelf 4.

The product specifying information (article specifying information) is information for specifying the products arranged on the product shelf 4 indicated by the corresponding product shelf ID. For example, the product specifying information is an image of the product. The product specifying information may be a feature amount (for example, sloping information (HOG information) of the products image) extracted from the image of the products by a predetermined processing. The product specifying information may also be information indicating the distribution of the feature amount. The product specifying information may also be three-dimensional (3-D) data of a product, a character string of the product name, etc., or a code indicating the product, etc. The configuration of the product specifying information is not limited to a specific configuration.

A function realized by the processing unit 21 is explained below.

The processing unit 21 realizes the functions of an image acquiring unit 31, a product shelf specifying unit 32, a product presence/absence determining unit 33, and a calculator 34, etc.

The image acquiring unit 31 (acquiring unit) acquires an image (photographed image) photographed by the photographing unit 12. For example, the image acquiring unit 31 transmits a signal to the photographing unit 12 through the interface 22 for causing the photographing unit 12 to photograph an image. The image acquiring unit 31 acquires the image photographed by the photographing unit 12 through the interface 22. The image acquiring unit 31 may also acquire the photographed image from an external device through a communication interface, etc.

The product shelf specifying unit 32 (shelf specifying unit) specifies the product shelf 4 from the photographed image. For example, the product shelf specifying unit 32 specifies the code display area 42 from the photographed image. For example, the product shelf specifying unit 32 specifies the code display area 42 by performing a raster scan with respect to the photographed image. When the code display area 42 is specified, the product shelf specifying unit 32 reads the shelf specifying code displayed in the code display area 42. The product shelf specifying unit 32 decodes the shelf specifying code and acquires the product shelf ID.

The product presence/absence determining unit 33 determines whether or not the product to be arranged on the product shelf 4 specified by the product shelf specifying unit 32 is arranged. For example, the product presence/absence determining unit 33 includes a product specifying information acquiring unit 33a, a product searching unit 33b, and a product presence/absence deciding unit 33c.

The product specifying information acquiring unit 33a (article specifying information acquiring unit) acquires product specifying information corresponding to the specified product shelf 4. For example, the product specifying information acquiring unit 33a refers to the shelf product database stored in the memory area 23a of the memory unit 23, and acquires the product specifying information corresponding to the product shelf ID. The product specifying information acquiring unit 33a may also acquire the product specifying information from an external device through a communication interface, etc.

The product searching unit 33b (article searching unit) searches for the product specified by the product specifying information from the product shelf 4. For example, the product searching unit 33b searches for the presence of the product specified by the product specifying information within the storage space 41 of the product shelf 4 in the photographed image.

The product searching unit 33b searches for the product in accordance with the configuration of the product specifying information. For example, the product searching unit 33b searches for the product by performing a raster scan in the storage space 41 using a predetermined matching processing. For example, the product searching unit 33b searches for the product by performing a feature point matching processing, a template matching, a three-dimensional matching, a feature amount matching, a character string matching, or a numerical sequence matching, etc. The method in which the product searching unit 33b searches for the product is not limited to a specific method.

The product searching unit 33b may also specify the storage space 41 based on the position of the code display area 42. For example, the code display area 42 may be at a predetermined position (for example, the upper left) of the product shelf 4 so that the product searching unit 33b may specify the position of the product shelf 4 or the storage space 41 from the position of the code display area 42. The product searching unit 33b may also specify the storage space 41 in accordance with a feature amount such as brightness.

The product presence/absence deciding unit 33c decides the presence/absence of the product that should be arranged on the product shelf 4 based on the search result of the product searching unit 33b. For example, if the product that should be on the product shelf 4 according to the shelf product database is found, the product presence/absence deciding unit 33c determines that the product to be arranged on the product shelf 4 specified by the product shelf specifying unit 32 is arranged. If the product that should be on the product shelf 4 according to the shelf product database is not found, the product presence/absence deciding unit 33c determines that the product is not arranged.

The calculator 34 executes various calculations. For example, the calculator 34 may calculate a predetermined feature amount of each portion of the photographed image in order to find the code display area 42. The calculator 34 may also calculate a predetermined feature amount of each portion of the photographed image in order to search for a product.

The processing unit 21 may display the determination result of the product presence/absence determining unit 33 through the display unit 25, etc. For example, the processing unit 21 may display on the display unit 25 that the product to be arranged on the product shelf 4 is arranged. The processing unit 21 may also display on the display unit 25 information of the products that are not arranged among the products which should be arranged on the product shelf 4.

An operation example of the image processing apparatus 1 is explained below.

FIG. 4 is a flowchart for demonstrating the operation example of the image processing apparatus 1.

First of all, the processing unit 21 of the image processing apparatus 1 acquires a photographed image (ACT 11). When the photographed image is acquired, the processing unit 21 specifies the product shelf 4 based on the acquired photographed image (ACT 12).

When the product shelf 4 is specified, the processing unit 21 acquires product specifying information corresponding to the specified product shelf 4 from the shelf product database (ACT 13). When the product specifying information is acquired, the processing unit 21 searches for the product specified by the acquired product specifying information from the storage space 41 of the photographed image (ACT 14).

When searching for the product, the processing unit 21 determines if the product that should be arranged in the storage space 41 of the product shelf 4 is arranged based on the searching result (ACT 15). When the processing unit 21 determines if the product to be arranged in the storage space 41 of the product shelf 4 is arranged, the processing unit 21 externally displays the determination result (ACT 16).

When the determination result is displayed externally, the processing unit 21 ends the operation.

The processing unit 21 may also transmit the determination result to an external device.

The shelf product database may be linked to or integrated with POS information.

The image processing apparatus configured in the above manner is capable of specifying a product that should be arranged on a product shelf from the photographed image, and checking if the specified product is arranged on the product shelf. Therefore, the image processing apparatus is capable of specifying a product that is not properly arranged on the product shelf. As a result, the image processing apparatus is capable of effectively checking the arrangement of the products.

(Second Embodiment)

The second embodiment is explained below.

An image processing apparatus 1 of the second embodiment is different from the image processing apparatus 1 of the first embodiment in that the image processing apparatus 1 checks if a product is arranged at a position corresponding to a label attached to a product shelf 4. Therefore, the same symbols as used in the first embodiment will be used for points other than the differences above, and detailed explanations thereof will be omitted.

Figure 5:
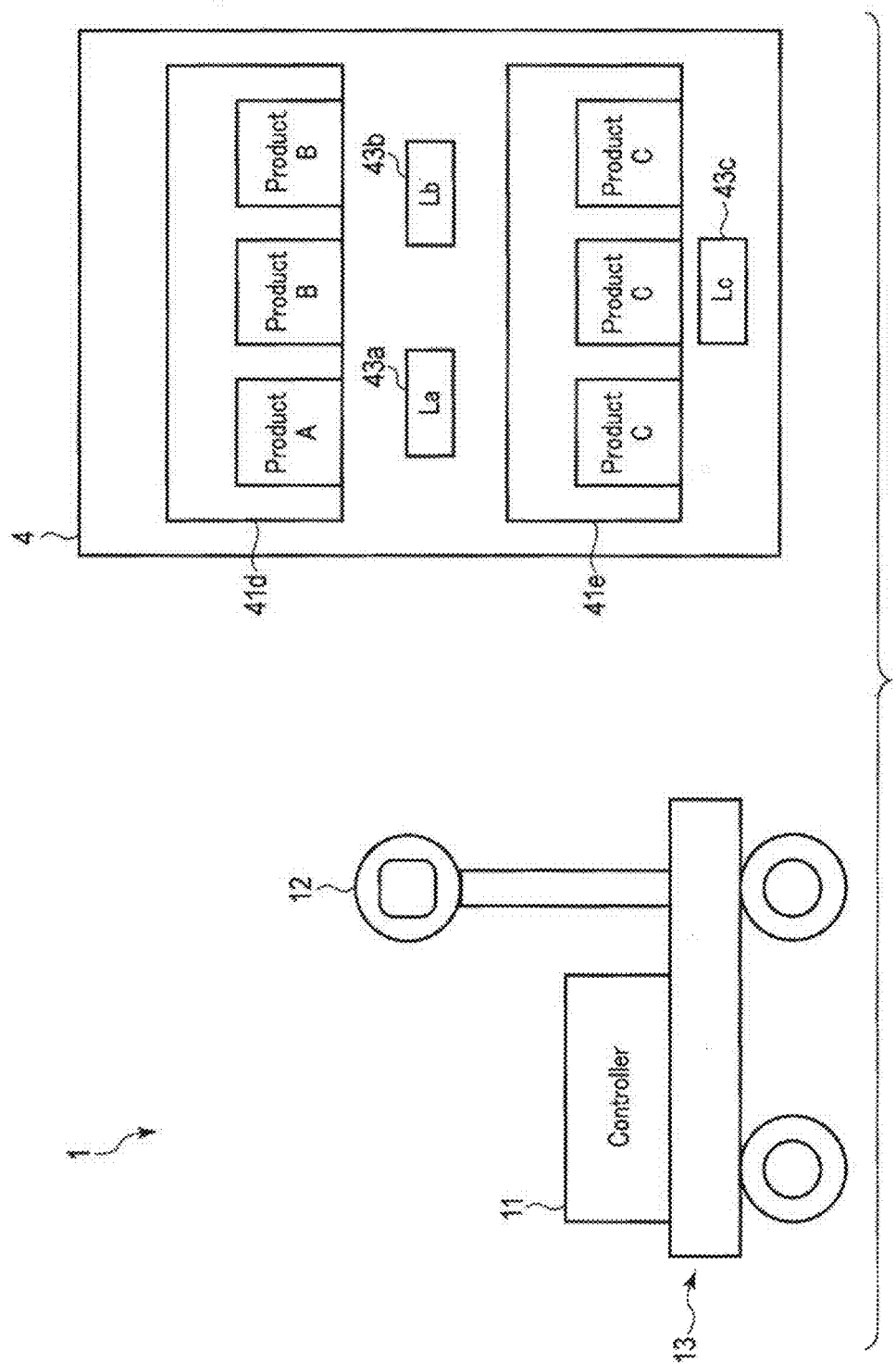
FIG. 5 is a diagram schematically showing a configuration example of an image processing apparatus of a second embodiment.

FIG. 5 is a diagram showing a configuration example of the image processing apparatus 1 and the product shelf 4 of the second embodiment.

As shown in FIG. 5, the product shelf 4 includes a storage space 41d, a storage space 41e, a label 43a, a label 43b, and a label 43c, etc.

The storage spaces 41d and 41e are the same as the storage spaces 41a and 41c.

The storage space 41d stores one of product A and two of product B. The storage space 41e stores three of product C.

The label 43 indicates details of the products. For example, the label 43 indicates the name or the price, etc. of the corresponding product. The label 43 may also indicate a production area, a discount rate, or a coupon etc. The information indicated by the label 43 is not limited to a specific configuration.

For example, the label 43a corresponds to product A. In other words, the label 43a indicates details of product A. Labels 43b and 43c correspond respectively to products B and C.

The label 43 may also correspond to a plurality of numbers of the same kind of product. For example, the label 43b corresponds to two of product B. The label 43c corresponds to three of product C.

Label 43 is explained below.

The label 43 includes a character string display area 44 and a code display area 45.

Figure 6:
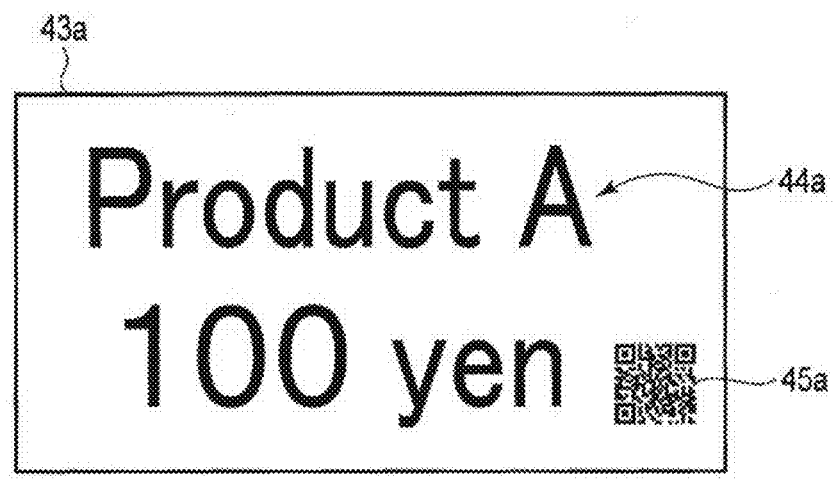
FIG. 6 is a diagram showing an example of a label of the second embodiment.

FIG. 6 explains a configuration example of the label 43a.

As shown in FIG. 6, the label 43a includes a character string display area 44a, and a code display area 45a, etc.

The character string display area 44a displays details of a product by a character string. In the example shown in FIG. 6, the character string display area 44a displays the product name and the price thereof. The content displayed by the character string display area 44a is not limited to a specific configuration.

The code display area 45a is an area where a label specifying code that specifies the label 43a is displayed. For example, the label specifying code is a one-dimensional code or a two-dimensional code. For example, when decoded, the label specifying code indicates a label ID, etc. that uniquely specifies the label 43a. The label specifying code may be a character string, a number, a symbol, or a combination thereof. The configuration of the label specifying code is not limited to a specific configuration.

The configuration example of the image processing apparatus 1 is explained below.

FIG. 7 is a block diagram showing a configuration example of the image processing apparatus 1.

A memory unit 23 includes a memory area 23b that stores a label product database and a memory area 23c that stores a product position database etc.

First, the label product database is explained below. FIG. 8 is a diagram showing a configuration example of a label product database.

The label product database indicates product specifying information corresponding to the label 43.

As shown in FIG. 8, the shelf product database associates and stores a label ID, a label type, a product ID, and product specifying information.

The label ID specifies the label 43. For example, the label ID is obtained by decoding the label specifying code.

The label type indicates the type of the corresponding label ID. The label type indicates the relative positional relationship between a position where the label 43 is attached and a position where a product is arranged.

The product ID and the product specifying information are the same as those mentioned in the first embodiment.

The product position database is explained below.

FIG. 9 is a diagram showing a configuration example of a product position database.

The product position database indicates product position information corresponding to the label type.

As shown in FIG. 9, the product position database associates and stores a label type and product position information.

The label type is as explained above.

The product position information (article position information) indicates the position of the product by a relative positional relationship with the label 43 based on the size of the label. The product position information may indicate the position of one product or positions of a plurality of products. The number of products for which the product position information indicates the position is not limited to a specific number.

Figure 10:
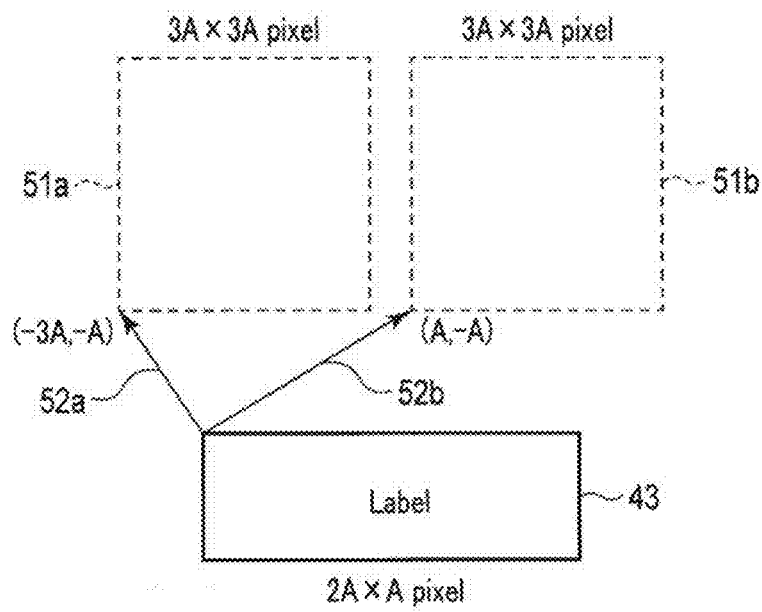
FIG. 10 is a diagram showing a configuration example of product position information of the second embodiment.

FIG. 10 shows a configuration example of the product position information.

In the example shown in FIG. 10, the product position information indicates the position of the product by a relative value. The product position information corresponds to a 2A×A pixel label 43. The product position information indicates arrangement areas 51a and 51b in which the product is to be arranged. In other words, as the arrangement area 51a, the product position information indicates a 3A×3A area whose lower left vertex is positioned at a distal end of a vector 52a (−3A, −A) from the upper left vertex of the label 43. As the arrangement area 51b, the product position information indicates a 3A×3A area whose lower left vertex is positioned at a distal end of a vector 52b (A, −A) from the upper left vertex of the label 43.

Figure 11:
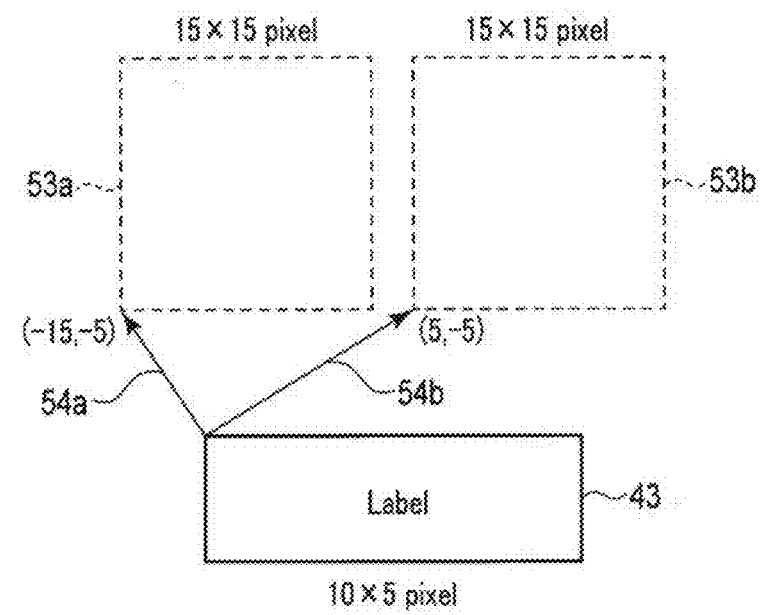
FIG. 11 is a diagram showing another configuration example of product position information of the second embodiment.

FIG. 11 shows another configuration example of the product position information.

In the example shown in FIG. 11, the product position information indicates the position where the product is arranged by an absolute value. The product position information corresponds to a 10×5 pixel label 43. The product position information indicates arrangement areas 53a and 53b in which the products are to be arranged. In other words, as the arrangement area 53a, the product position information indicates a 15×15 area whose lower left vertex is positioned at a distal end of a vector 54a (−15, −5) from the upper left vertex of the label 43. As the arrangement area 53b, the product position information indicates a 15×15 area whose lower left vertex is positioned at a distal end of a vector 54b (5, −5) from the upper left vertex of the label 43.

The configuration of the product position information is not limited to a specific configuration.

A function realized by a processing unit 21 is explained below.

The processing unit 21 realizes the functions of an image acquiring unit 31, a calculator 34, a label specifying unit 35, and a product presence/absence determining unit 36, etc.

The calculator 34 is the same as that of the first embodiment.

The image acquiring unit 31 acquires a photographed image in which the label 43 is photographed.

The label specifying unit 35 specifies the label 43 and the position of the label 43 from the photographed image. For example, the label specifying unit 35 specifies a code display area 45 from the photographed image. For example, the label specifying unit 35 specifies the code display area 45 by performing a raster scan with respect to the image. When the code display area 45 is specified, the label specifying unit 35 reads the label specifying code displayed by the code display area 45. For example, the label specifying unit 35 obtains a label ID by decoding the label specifying code. For example, the label specifying unit 35 specifies the position of the label 43 from the position of the code display area 45.

The product presence/absence determining unit 36 determines if the product corresponding to the label 43 specified by the label specifying unit 35 is arranged at a position corresponding to the label 43. For example, the product presence/absence determining unit 36 includes a product specifying information acquiring unit 36a, a product position information acquiring unit 36b, a product searching unit 36c, and a product presence/absence deciding unit 36d.

The product specifying information acquiring unit 36a (article specifying information acquiring unit) acquires product specifying information corresponding to the specified label 43. For example, the product specifying information acquiring unit 36a refers to the label product database stored in the memory area 23b of the memory unit 23, and acquires the product specifying information corresponding to the label ID of the specified label 43. The product specifying information acquiring unit 36a may acquire the product specifying information corresponding to the label 43 from an external device through a communication interface, etc.

The product position information acquiring unit 36b (article position information acquiring unit) acquires product position information corresponding to the specified label 43. For example, the product position information acquiring unit 36b refers to the label product database stored in the memory area 23b of the memory unit 23, and acquires the label type corresponding to the label ID of the specified label 43. The product position information acquiring unit 36b refers to the product position database stored in the memory area 23c of the memory unit 23, and acquires the product position information corresponding to acquired label type. The product position information acquiring unit 36b may also acquire the product position information corresponding to the label 43 from an external device through a communication interface, etc.

The product searching unit 36c (article searching unit) searches to determine if the product specified by the product specifying information is present at a position indicated by the product position information. For example, based on the position of the label 43, the size of the label 43 in the photographed image, and the product position information corresponding to the label 43, the product searching unit 36c sets a product area (article area) where the product is shown in the photographed image. For example, if the product specifying information indicates the arrangement area by a relative value (for example, in the case of FIG. 10), the product searching unit 36c sets the product area based on the size of the label 43 in the photographed image. If the product specifying information indicates the arrangement area by an absolute value (for example, in the case of FIG. 11), the product searching unit 36c sets the product area based on the ratio of the size of the label 43 in the photographed image and the size of the label 43 indicated by the product position information.

The product searching unit 36c searches to determine if the product specified by the product specifying information is present in the set product area. The product searching unit 36c searches for the product in accordance with the configuration of the product specifying information. For example, the product searching unit 36c searches for the product in the product area using a predetermined matching processing. For example, the product searching unit 36c searches for the product by performing a feature point matching processing, a template matching, a 3-D matching, a feature amount matching, a character string matching, or a numerical sequence matching, etc. The method in which the product searching unit 36c searches for the product is not limited to a specific method.

The product presence/absence deciding unit 36d decides the presence/absence of the product based on the search result of the product searching unit 36c. For example, if the product specified by the product specifying information corresponding to the label 43 is found at a position indicated by the product position information corresponding to the label 43, the product presence/absence deciding unit 36d determines that the product corresponding to the label 43 specified by the label specifying unit 35 is arranged at a position corresponding to the label 43. If the product specified by the product specifying information corresponding to the label 43 is not found at a position indicated by the product position information corresponding to the label 43, the product presence/absence deciding unit 36d determines that the product corresponding to the label 43 specified by the label specifying unit 35 is not arranged at a position corresponding to the label 43.

The processing unit 21 may display the determination result of the product presence/absence determining unit 36 through the display unit 25, etc. For example, the processing unit 21 may display on the display unit 25 that the product is properly arranged with respect to the label 43. The processing unit 21 may also display on the display unit 25 information of the product that is not arranged at a position corresponding to the label 43.

An operation example of the image processing apparatus 1 is explained below.

Figure 12:
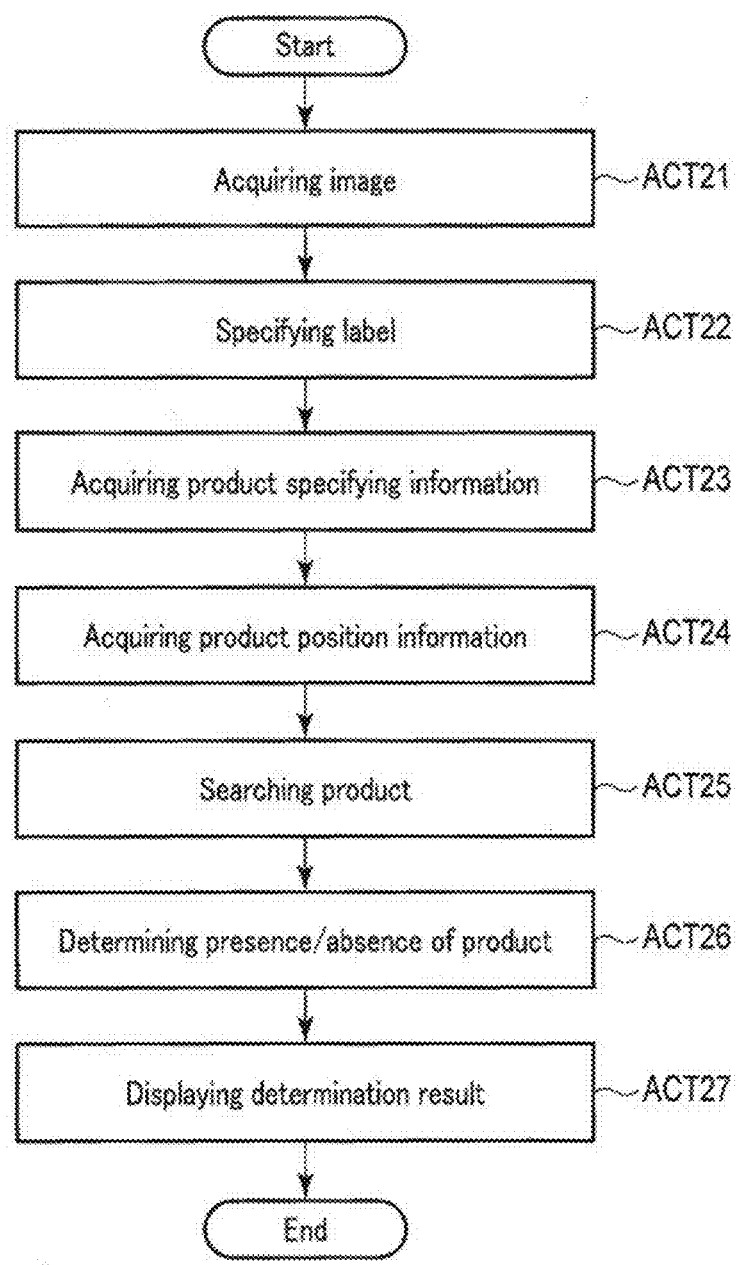
FIG. 12 is a flowchart showing an operation example of the image processing apparatus of the second embodiment.

FIG. 12 is a flowchart for demonstrating the operation example of the image processing apparatus 1.

To start, the processing unit 21 of the image processing apparatus 1 acquires a photographed image (ACT 21). When the photographed image is acquired, the processing unit 21 specifies the label 43 from the photographed image (ACT 22).

When the label 43 is specified, the processing unit 21 acquires product specifying information corresponding to the label 43 (ACT 23). When the product specifying information is acquired, the processing unit 21 acquires product position information corresponding to the label 43 (ACT 24).

When the product position information is acquired, the processing unit 21 searches for the product specified by the product specifying information from the product area which is set based on the product position information (ACT 25). When searching for the product, the processing unit 21 determines if the product is present at a position corresponding to the label 43 based on the search result (ACT 26). When the product is determined as being present at the position corresponding to the label 43, the processing unit 21 displays the determination result (ACT 27). When the determination result is displayed, the processing unit 21 ends the operation.

If the photographed image includes a plurality of labels 43, the processing unit 21 may execute ACT 22 to ACT 26 with respect to each individual label 43. The processing unit 21 may specify that there is a plurality of labels in ACT 22 and execute ACT 23 to ACT 26 in parallel with the plurality of labels.

The processing unit 21 may also transmit the determination result to an external device.

The image processing apparatus configured in the above manner is capable of specifying the label from the photographed image, and specifying the product corresponding to the label and the position of the product. The image processing apparatus is also capable of checking if the product is properly arranged at a product position. As a result, the image processing apparatus is capable of effectively checking the arrangement of the products.

(Third Embodiment)

An image processing apparatus 1 according to a third embodiment is explained below.

The image processing apparatus 1 of the third embodiment is different from the image processing apparatus 1 of the second embodiment in that the image processing apparatus 1 estimates the remaining number of products on a product shelf 4. Therefore, the same symbols as used in the first embodiment will be used for points other than the differences above, and detailed explanations thereof will be omitted.

Figure 13:
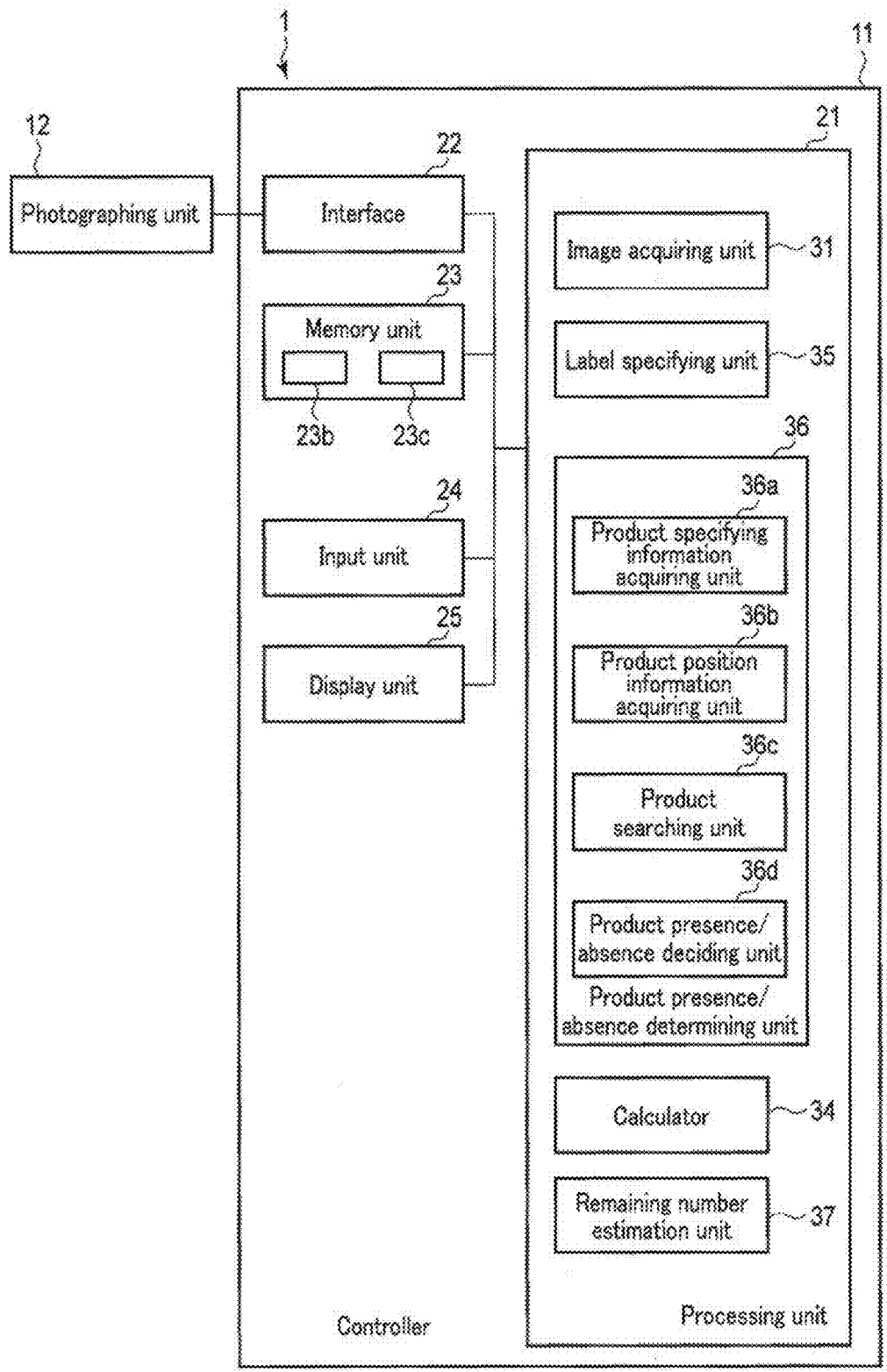
FIG. 13 is a block diagram showing a configuration example of an image processing apparatus of a third embodiment.

FIG. 13 shows a configuration example of the image processing apparatus 1 of the third embodiment.

The processing unit 21 realizes a remaining number estimation unit 37.

The remaining number estimation unit 37 estimates the number of products (number of articles) to be arranged in a storage space 41 based on a photographed image.

For example, the remaining number estimation unit 37 estimates the remaining number of products based on the size, the brightness, or the contrast, etc. of the product image.

Figure 14:
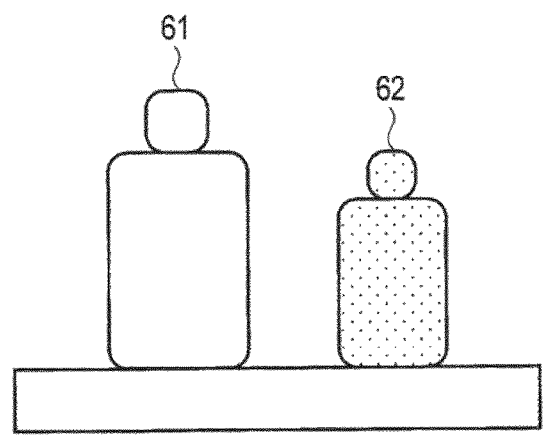
FIG. 14 is a diagram showing an example of a product arrangement of the third embodiment.

FIG. 14 is an example of a photographed image of the storage space 41 of the product shelf 4.

As shown in FIG. 14, the storage space 41 includes a product 61 and a product 62, etc. The storage space 41 stores the same type of product for each row of the product 61 and the product 62 to the back of each row.

The product 61 is arranged at a relatively forward position of the product shelf 4. Therefore, the product image of the product 61 is relatively large, bright, and in high-contrast.

The product 62 is arranged at a relatively rearward position of the product shelf 4. Therefore, the product image of the product 62 is relatively small, dark, and in low-contrast.

The remaining number estimation unit 37 estimates the position of the product (in other words, the position from the rear towards the front of the storage space 41) based on the size, the brightness, or the contrast, etc. of the product image, and estimates the number of products arranged on the storage space 41 based on the position of the product. For example, if the product is positioned relatively forward, the remaining number estimation unit 37 would estimate that there are a large number of products in the back, and estimate that there is a relatively large number of products. If the product is positioned relatively rearward, the remaining number estimation unit 37 would estimate that there are a small number of products in the back, and estimate that there is a relatively small number of products.

The image processing apparatus 1 may be provided with a distance sensor to measure the distance from the photographing unit 12 to the products, and may estimate the position of the products based on the distance measured by the distance sensor.

The remaining number estimation unit 37 may also estimate the remaining number of products from the height of the loaded products.

Figure 15:
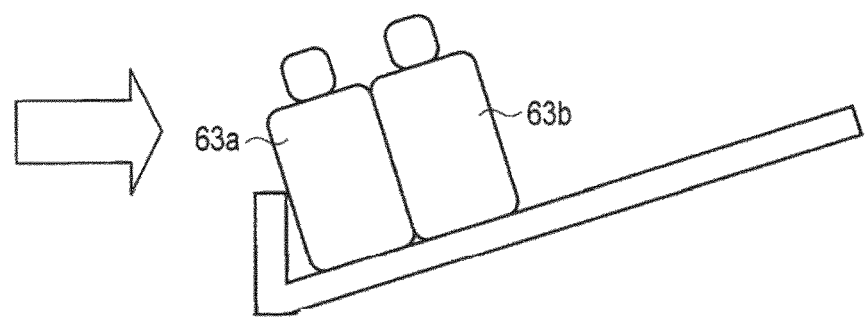
FIG. 15 is a diagram showing another example of a product arrangement of the third embodiment.
Figure 16:
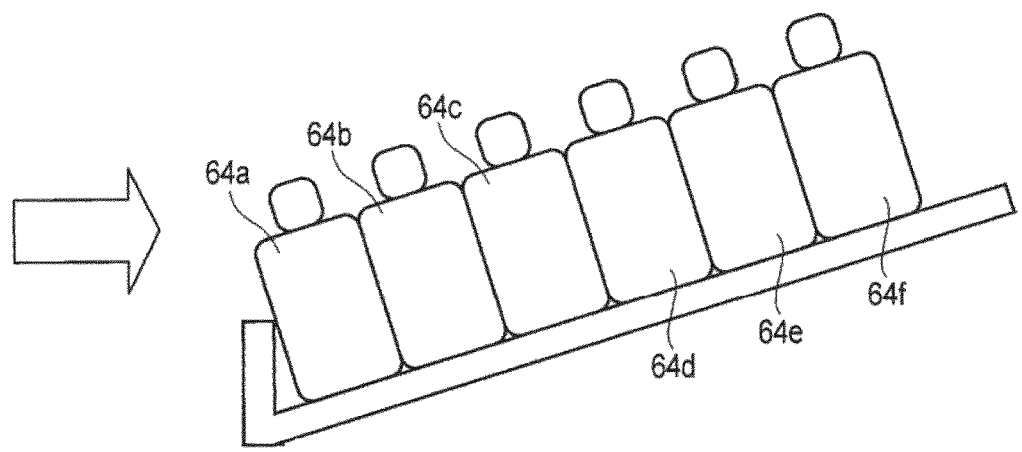
FIG. 16 is a diagram showing another example of a product arrangement of the third embodiment.

FIG. 15 and FIG. 16 are examples of side views of another storage space 41.

In the examples of FIG. 15 and FIG. 16, the storage space 41 stores the products on a tilted tray. The lower part of the tilted surface is positioned at the front side of the storage space 41. The upper part of the tilted surface is positioned at the rear side of the storage space 41. The arrow indicates the direction from which an image is taken by the photographing unit 12.

In the example shown in FIG. 15, the storage space 41 stores two products 63*a* and 63*b*. The tilt of the tray causes the products 63*a* and 63*b* to be positioned at the lower part of the tilted surface (at the front side of the storage space 41).

When the photographing unit 12 photographs the storage space 41 in the direction of the arrow, the product 63*a* and the product 63*b* will be shown in the photographed image. Since the product 63*a* and the product 63*b* are on a tilted tray, in the photographed image, the product 63*b* will be positioned behind and above the product 63*a*. Since the storage space 41 has two products 63*a* and 63*b*, the height of the loaded products (the products 63*a* and 63*b*) becomes relatively lower in the photographed image.

In the example shown in FIG. 16, the storage space 41 stores six products 64*a* to 64*f*. The tilt of the tray causes the products 64*a* to 64*f* to be positioned at the lower part of the tilted surface (at the front side of the storage space 41).

When the photographing unit 12 photographs the storage space 41 in the direction of the arrow, the products 64*a* to 64*f* will be shown in the photographed image. Since the products 64*a* to 64*f* are on a tilted tray, in the photographed image, the products 64*b* to 64*f* will be positioned behind and above the product 64*a*. Since the storage space 41 has six products 64*a* to 64*f*, the height of the loaded products (the products 64*a* to 64*f*) becomes relatively higher in the photographed image.

The remaining number estimation unit 37 estimates the height of the loaded products from the photographed image, and estimates the number of products based on the height of the loaded products. For example, if the height of the loaded products is relatively low, the remaining number estimation unit 37 estimates that the number of products is comparatively small. If the height of the loaded products is relatively high, the remaining number estimation unit 37 estimates that the number of products is relatively large.

The remaining number estimation unit 37 may also estimate the number of products based on an area, etc. of the loaded products.

The method in which the remaining number estimation unit 37 estimates the remaining number of products is not limited to a specific configuration.

The processing unit 21 may also display the estimated remaining number of products on a display unit 25, etc.

The processing unit 21 of the image processing apparatus 1 of the first embodiment may also realize the function of the remaining number estimation unit 37.

The image processing apparatus that is configured in the above manner is capable of estimating the number of products arranged in the storage space from the photographed image. Therefore, the image processing apparatus is capable of checking if an appropriate number of products are arranged in the storage space. As a result, the image processing apparatus is capable of effectively checking the arrangement of the products.

(Fourth Embodiment)

An image processing apparatus 1 according to a fourth embodiment is explained below.

The image processing apparatus 1 of the fourth embodiment is different from the image processing apparatus 1 of the third embodiment in that an alert is issued based on the remaining number of products. Therefore, the same symbols as used in the third embodiment will be used for points other than the differences above, and detailed explanations thereof will be omitted.

Figure 17:
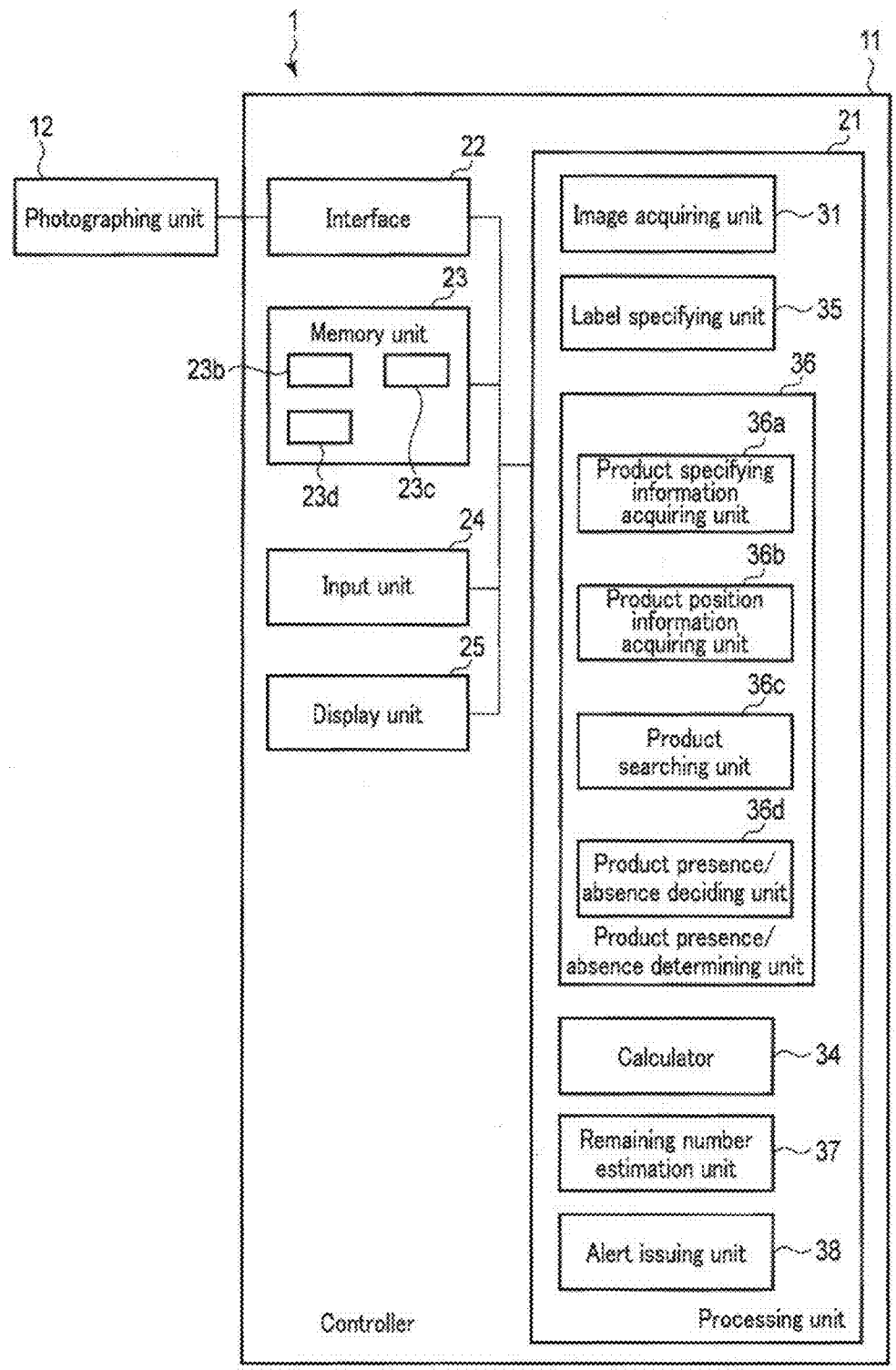
FIG. 17 is a block diagram showing a configuration example of an image processing apparatus of a fourth embodiment.

FIG. 17 shows a configuration example of the image processing apparatus 1 of the fourth embodiment.

A memory unit 23 includes a memory area 23$d$ that stores an alert table.

FIG. 18 is a diagram showing a configuration example of the alert table.

The alert table indicates a condition for issuing an alert.

Here, A presents the number of products estimated by a remaining number estimation unit 37. B presents a stock quantity of products that are arranged in a back room of a store in which the image processing apparatus 1 is set.

The alert table indicates that if the number of product A in the storage space 41 is not 0 (A≠0), an alert is not issued. The alert table indicates that if the number of product A in the storage space 41 is 0, and the stock quantity B is also 0 (A=0 and B=0), an alert notifying of a stock outage is issued. The alert table indicates that if the number of product A in the storage space 41 is 0, and the stock quantity B is not 0 (A=0 and B≠0), an alert notifying of a product shortage is issued.

The processing unit 21 realizes the function of an alert issuing unit 38.

The alert issuing unit 38 issues an alert regarding the products based on the estimated number of products. For example, the alert issuing unit 38 displays a predetermined alert message on a display unit 25. The alert issuing unit 38 may also issue a different alert in accordance with the number of products.

For example, the alert issuing unit 38 acquires the stock quantity B. The alert issuing unit 38 issues an alert in accordance with the alert table stored in the memory area 23$d$ based on the number of product A and the stock quantity B. For example, if A=0 and B≠0, the alert issuing unit 38 issues an alert notifying of a product shortage.

The alert issuing unit 38 may determine whether or not a condition for issuing an alert is satisfied every time the remaining number estimation unit 37 estimates the number of product A. The alert issuing unit 38 may determine whether or not a condition for issuing an alert is satisfied at predetermined intervals.

Another example of the alert table is explained below.

FIG. 19 shows another configuration example of the alert table.

As shown in FIG. 19, the alert table indicates that if the number of product A in the storage space 41 is larger than a predetermined threshold value α (A>α), the alert is not issued. The alert table indicates that if the number of pieces of product A is equal to or less than α, and the stock quantity B is 0 (A≤α and B=0), an alert warning of a stock outage is issued. The alert table indicates that if the number of products A is equal to or less than α, and the stock quantity B is not 0 (A≤α and B≠0), an alert warning of a product shortage is issued. The alert table indicates that if the number of product A in the storage space 41 is 0, and the stock quantity B is also 0 (A=0 and B=0), an alert notifying of a stock outage is issued. The alert table indicates that if the number of products A in the storage space 41 is 0, and the stock quantity B is not 0 (A=0 and B≠0), an alert notifying of a product shortage is issued.

An example of an alert table when the stock quantity B is unclear is explained below.

Here, the alert issuing unit 38 acquires the number of purchased products (purchased quantity C).

FIG. 20 shows an example of an alert table.

The alert table indicates that if the number of product A in the storage space 41 is not 0 (A≤0), an alert is not issued. The alert table indicates that if the number of product A in the storage space 41 is 0, and an estimated number of remaining pieces obtained by subtracting sales quantity from the purchased quantity C is equal to or less than a predetermined threshold value β (A=0 and C-sales quantity≤β), an alert notifying a stock outage is issued. The alert table indicates that if the number of product A in the storage space 41 is 0, and the estimated number of remaining pieces is larger than β (A=0 and C-sales quantity>β), an alert notifying of a product shortage is issued. β is a buffer that takes into consideration a case where the number of products in storage spaces is reduced due to loss or damage. β may be 0.

FIG. 21 shows another configuration example of the alert table.

As shown in FIG. 21, the alert table indicates that if the number of product A in the storage space 41 is larger than a predetermined threshold value α (A>α), the alert is not issued. The alert table indicates that if the number of product A is equal to or less than α, and the estimated number of remaining pieces is equal to or less than β (A≤α and C-sales quantity≤β), an alert warning of a stock outage is issued. The alert table indicates that if the number of product A is equal to or less than α, and the estimated number of remaining pieces is larger than β (A≤α and C-sales quantity>β), an alert notifying of a product shortage is issued. The alert table indicates that if the number of product A in the storage space 41 is 0, and the estimated number of remaining pieces is equal to or less than the predetermined threshold value β (A=0 and C-sales quantity≤β), an alert notifying of a stock outage is issued. The alert table indicates that if the number of products in the storage space 41 is 0, and the estimated number of remaining pieces is larger than β (A=0 and C-sales quantity>β), an alert notifying of a product shortage is issued.

The alert issuing unit 38 acquires the purchased quantity C and the sales quantity. The alert issuing unit 38 issues an alert in accordance with the alert table stored in the memory area 23$d$ based on the number of product A, the purchased quantity C, and the sales quantity.

The configuration of the alert table is not limited to a specific configuration.

The image processing apparatus that is configured in the above manner is capable of issuing an alert in accordance with the number of remaining products arranged in the storage space. As a result, the image processing apparatus is capable of prompting to restock the products when the number of products in the storage space is reduced. Therefore, the image processing apparatus is capable of prompting an appropriate arrangement of products.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
   an interface that acquires a photographed image showing one or more articles that are presently stored on a tray that is tilted with respect to a horizontal plane, wherein the one or more articles are imaged in a horizontal direction; and
   a processor configured to:
   determine a total height of the one or more articles presently on the tray based on the photographed image, wherein the total height is measured as a length of the one or more articles on the tilted tray in the photographed image; and
   estimate a number of the one or more articles that are presently on the tilted tray based on the determined total height of the one or more articles.

2. The image processing apparatus according to claim 1, wherein the processor is configured to:
   specify a label with information regarding the one or more articles stored on the tray from the photographed image;
   acquire article position information, the article position information associated with the label and indicating a position of the one or more articles by a relative positional relationship with the label;
   search if there is an article of the one or more articles that is associated with the label at a position indicated by the article position information;
   acquire article specifying information which specifies the article at the position indicated by the article position information; and
   determine if the article at the position indicated by the article position information is associated with the label based on the article specifying information.

3. The image processing apparatus according to claim 2, wherein the processor is configured to:
   specify a position of the label;
   set an article area that shows the one or more articles specified by the article specifying information in the photographed image based on the position of the label, a size of the label in the photographed image, and the article position information; and
   search if the one or more articles are present in the article area.

4. The image processing apparatus according to claim 2, wherein
   the label comprises a display area that displays a label specifying code specifying the label, and
   the processor is configured to specify the label based on the label specifying code.

5. The image processing apparatus according to claim 2, comprising:
   a camera that photographs an image, wherein
   the interface acquires the photographed image through the camera.

6. The image processing apparatus according to claim 5, comprising:
   a cart that enables the camera to move in a state of being fixed at a predetermined height.

7. The image processing apparatus according to claim 2, wherein the processor is configured to issue an alert regarding the one or more articles associated with the label based on the estimated number of articles.

8. The image processing apparatus according to claim 1, wherein a first one of a plurality of articles is tilted at a first position on the tilted tray, and each of the other articles is i) above the first article and directly behind the first article along the imaged horizontal direction or ii) above a different one of the other articles and directly behind the different one of the other articles along the imaged horizontal direction.

* * * * *